(12) United States Patent
Qian et al.

(10) Patent No.: US 9,717,054 B2
(45) Date of Patent: Jul. 25, 2017

(54) DEVICE ASSISTED MULTI-STEP ADAPTIVE DISCONTINUOUS RECEPTION (DRX) OPERATIONS USING POWER PREFERENCE INDICATOR

(71) Applicant: Verizon Patent and Licensing Inc., Arlington, VA (US)

(72) Inventors: Nanjun Qian, Princeton, NJ (US); Yuk Lun Li, Morganville, NJ (US); Andrew E. Youtz, Princeton, NJ (US); Joseph Peter Kuhn, III, Hamilton, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 350 days.

(21) Appl. No.: 14/478,731

(22) Filed: Sep. 5, 2014

(65) Prior Publication Data
US 2016/0073284 A1    Mar. 10, 2016

(51) Int. Cl.
*H04W 52/02* (2009.01)
*H04W 76/04* (2009.01)

(52) U.S. Cl.
CPC ... *H04W 52/0251* (2013.01); *H04W 52/0229* (2013.01); *H04W 76/048* (2013.01); *Y02B 60/50* (2013.01)

(58) Field of Classification Search
CPC .............. H04W 52/02; H04W 52/0216; H04W 52/0229; H04W 52/0251; H04W 76/048
See application file for complete search history.

(56) References Cited

U.S. PATENT DOCUMENTS

2013/0301500 A1*  11/2013  Koc ............... H04W 76/048
                                                                370/311
2014/0036750 A1*  2/2014  Yavuz ............ H04W 52/0216
                                                                370/311

OTHER PUBLICATIONS

"Adaptive DRX Configuration to Optimize Device Power Saving and Latency of Mobile Applications over LTE Advanced Network", Satish C. Jha et al, IEEE, 2013.*
Maruti Gupta, et al., "Energy Impact of Emerging Mobile Internet Applications on LTE Networks: Issues and Solutions", LTE Technology Update: Part 2, Communications Magazine, IEEE, vol. 51, Issue:2, Feb. 2013, pp. 90-97.

* cited by examiner

*Primary Examiner* — Habte Mered

(57) ABSTRACT

Examples of power conservation management for user equipment based on the operating state of the user equipment are provided. A user equipment may implement a power managing application that monitors the activity of the user equipment, such as the number of applications open on the user equipment, the data usage requirements for each open application, data delay tolerances for each application and/or a level of user interaction with the device at a given moment. Based on the level of activity and the data requirements, the managing application on the user equipment is able to make a discontinuous reception profile setting recommendation selected from more than two discontinuous reception profiles to the mobile communications network entity. In response to the discontinuous reception profile setting recommendation, the network entity may modify the connection status with the user equipment.

20 Claims, 6 Drawing Sheets

100

TABLE 1 where * indicates example of most frequently used profiles.

DEVICE ASSISTED MULTI-STEP ADAPTIVE DISCONTINUOUS RECEPTION (DRX) OPERATIONS USING POWER PREFERENCE INDICATOR

BACKGROUND

In recent years, an area of intensive research has been in the conservation of battery life of a mobile device. As a greater number of applications are becoming available that require near constant network access and require power on a near constant basis, the previous methods of conserving power on a mobile device are not compatible with today's trend of increased data and power usage.

One of the issues is a frequent use of network assets as the mobile devices disconnect from the network and then attempt to reconnect after a short amount of time. The connection/reconnection attempts consume signaling bandwidth, and when a large number of devices are attempting to access the network, a large amount of the signaling bandwidth is consumed.

In long term evolution (LTE) networks, discontinuous reception (DRX) is a power saving method executed by a mobile device during communication between the mobile device and a cellular communication network to which the mobile device is connected. DRX is a setting in the mobile device that is set by an entity in the cellular communication network (e.g., an eNodeB) based on a message to a mobile device (i.e., the User equipment (UE) in a mobile network context). The DRX message from the eNodeB instructs the UE to remain in one of two states: connected or inactive. Said differently, when the UE receives a DRX "connected" message the UE remains active (i.e., stays connected—receiving data from and/or transmitting data to the network), but when the UE receives the "inactive" DRX message, the UE sleeps (i.e., goes into or remains in an inactive state—remains idle and does not receive or transmit data to the network). The UE follows a protocol defined by the network to switch between sleep and active modes. The longer the sleeping period and shorter the active periods, the greater the power savings.

However, there is a trade off between data throughput and power saving. From a power saving point of view, a UE needs to more frequently enter into the sleep mode to save power. But to send or receive data, the UE then has to transition back to the active state. Transition to an active state includes signaling the network. Depending on the traffic patterns, the UE may frequently transition between sleep mode and active mode, which may result in high volume of network signalling and/or data throughput jitter. Jitter may be defined as arrival time variations of voice-over-IP (VoIP) packets due to network congestion, timing drift, and/or route changes. From the throughput point of view, the UE should always be active in order to achieve the best data throughput results. It is very difficult to achieve a balance between power savings and throughput.

Typically, an eNodeB of a cellular communication network provides DRX setting instructions to an UE. Based on the DRX setting instructions, the UE sets its DRX setting. For example, the eNodeB will set one DRX setting for VoIP, while data communication will have another DRX setting. Currently, the eNodeB has complete control of the DRX settings for a UE, and the UE has no input into the DRX setting. The DRX setting instructions sent by an eNodeB may not conform to the current use of the UE.

However, in a latest standard release, 3GPP standard, Release 11, a UE can send a signal to an eNodeB of cellular communicaiton network that influences the network configuration. The signal sent by the UE is a Power Preference Indicator (PPI), which is a single bit value (i.e., 0 or 1) indication defined by 3GPP standard, Release 11.

It has been suggested to use the PPI signal to select between a low latency DRX profile (PPI=0) (e.g., remains active for longer periods but sleeps less) and a low power DRX profile (PPI=1) (e.g., sleeps more often or for longer periods but is less active). However, this suggestion allows only two possible profiles since the PPI is a single bit definition state indicator. Due to different types of data traffic and UE data usage scenarios, there is a need to have more flexible ways to specify and control more than two DRX profiles so a better balance between power and throughput may be achieved.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
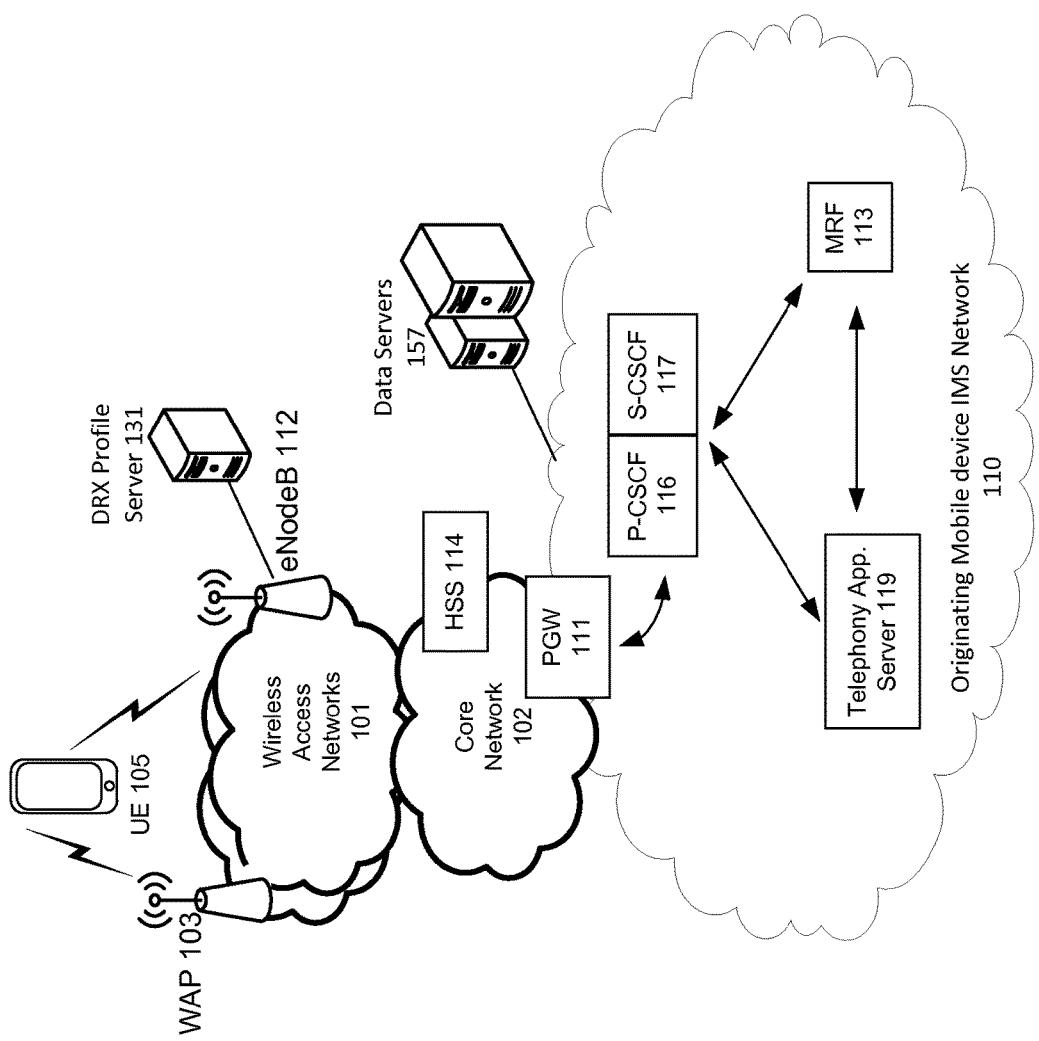
FIG. 1 is a high-level functional block diagram of an example of a system of networks/devices that provide various communications for mobile devices and support an example of the UE DRX profile selection service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to selecting different network power conservation levels for a UE based on the operating state of the UE. For example, a power managing application executing on the mobile device monitors the activity of the UE, such as the number of applications operating (e.g., including background applications) on the UE, the data usage requirements for each operating application, data delay tolerances for each application and a level of user interaction with the device at a given moment (i.e., input and output device usage), and other information. Based on the monitored level of activity and the data requirements, the managing application on the UE is able to make a DRX profile recommendation to the mobile communications network entity, in this example, an eNodeB. In response to the DRX recommendation, the eNodeB may modify the connection status of the UE. However, the DRX profile recommendation is not based on a choice between only two DRX profiles as discussed above, but between more than two DRX profiles. Other examples, as explained in more detail below, describe an adaptive DRX profile recommendation provided to a server connected to the eNodeB. In response to the recommendation, the server provides a DRX profile modification to the eNodeB, which is forwarded to the UE.

The connection status of the UE is selected from, not just two DRX profiles, but from some greater number (i.e., greater than 2) of different DRX profiles. Each profile may be a combination of different connected (i.e., active) and inactive (e.g., sleep or idle) periods that are optimized (as much as possible) for the different system operating states of the UE. An operating state may be defined by the number of applications executing on a UE, the type of applications executing on the UE, the data requirements of the executing applications, the data delay tolerances of the executing applications, and other parameters related to the executing applications, the UE system (e.g., encoder/decoder (video and audio)) performance capabilities, the quality of service (QoS) parameters for the UE connection with the mobile communications network, and the like.

The various system, mobile device and method examples discussed in this section relate to a service that provides a capability to manage power conservation settings via use of more than two (>2) DRX profiles for a DRX-enabled mobile device. In an example, the described system, method and DRX-enabled mobile device utilize non-Session Initiation Protocol-based communications over an Internet connection to provide the service that provides a capability to manage power conservation settings via use of more than two (>2) DRX profiles. In another example, the described system, method and DRX-enabled mobile device utilize an IP Multimedia Subsystem or an IP Multimedia Core Network Subsystem (IMS) to implement the service that provides a capability to manage power conservation settings via use of more than two (>2) DRX profiles. IMS is an architectural framework for delivering Internet Protocol (IP) multimedia services. IMS uses the Session Initiation Protocol (SIP) to provide integration with the Internet, and provides access of multimedia and voice applications from wireless and wireline terminals. A user can connect to IMS in different ways, including the standard Internet Protocol (IP). IMS terminals or UEs (e.g., mobile phones, computers, and personal digital assistants (PDAs)) can register directly on IMS, even when they are roaming in a different network, as long as IP and SIP are accessible. Mobile access via an LTE mobile network, other wireless access (e.g., Wi-Fi, WLAN, WiMAX), and fixed access (e.g., cable modems, Ethernet, DSL) are all supported.

A communication signaling protocol, for example, hypertext transport protocol (HTTP), simple mail transport protocol (STMP), real-time transport protocol (RTP) and session initiation protocol (SIP) is used in the establishment and control of sessions between multiple users that enable the multiple users to communicate with each other and with various network devices. The described examples may be used with any number of signaling communication protocols with messages that establish, terminate and perform other functions related to data exchanges (including voice) between devices. SIP is a signaling protocol utilized in IMS networks, for example, for set-up of sessions for voice or video calls as well as a variety of other data services. Shown in FIG. 1 are various pathways for signaling messages that are sent back and forth between the end users and various hardware devices within the IMS networks, in this example, to set up a mobile device-to-mobile device call. A general description of these components and the signaling between these components will now follow, after which examples of call flows will be described in somewhat more detail.

FIG. 1 shows a system 100 and signaling flow for a mobile communication session between a user equipment (UE) 105 and another device or system, such as a data server or another UE. In general, UE 105 communicate with their respective wireless access network 101 that have a connection to a core network 102 that connect to other networks to provide signaling to establish voice and data connections with destination or recipient devices/systems.

The wireless access network 101, for example, may include cellular and/or Wi-Fi network, and the core network 102 may be packet data network (PDN) or an evolved packet core (EPC). The wireless access network 101 may be accessed via base stations, such as an eNodeB 112 (or the like). One or more of wireless access network 101 might be implemented as a network conforming to the long term evolution (LTE) standard, or a Wi-Fi network according to 802.11xx or the like. Access to the Wi-Fi network of wireless access network 101 may be via a wireless access point (WAP) 103. The core network 102 may provide services such as a home subscriber server (HSS) 114, and a packet data gateway (PGW) 111. The HSS 114 may provide subscriber information related to the access to the respective networks 101, 102, and 110. The other network elements, such as data servers 157, may further facilitate session setup and provision of multimedia services to the UE 105.

The communications in a communication signaling protocol from each of the respective wireless access network 101 and core network 102 are passed to the respective IMS network 110 through packet data network gateway (PGW) device 111. The PGW 111 acts as an interface between, for example, the core network 102 and IMS network 110. Also included in IMS core 110 are one or more servers, called call session control function (CSCF) servers that control the signaling between the UE 105 via the IMS network 110 to set-up a communication session with a destination UE or a data server. The initial contact by a UE 105 with the network 110 is through a proxy call session control function (P-CSCF) server 116 that acts as a SIP proxy server for network 110 and receives control signals from devices external to the network 110, such as the UE 105. A serving call session control function (S-CSCF) server 117 acts as a point of control in the network 110 and provides a number of functions to control the sessions between the mobile devices. For example, the S-CSCF server 117 authenticates mobile devices with the network 110 communicates with the charging functions to insure an mobile device has proper permissions to access network services; serves to translate telephone numbers of mobile devices to uniform resource identifiers (URI) for use in the network 110; keeps track of charges incurred by users when access data services (e.g., data delivered to/from one or more of data servers 157; and other services.

The P-CSCF server 116 may serve as a first point of contact between a calling mobile device 101 and IMS core 110. The P-CSCF server 116 may serve as an outbound/ inbound SIP proxy server, where requests initiated by the calling mobile device 105, may traverse the P-CSCF server 116. For example, when attempting to establish a call session using a communication signaling protocol, such as SIP, the P-CSCF server 116 is typically the first point of contact in the IMS network, such as IMS core 110 that receives, for example, a voice over packet protocol message (e.g., a SIP INVITE message). The P-CSCF server 116 then utilizes the S-CSCF server 117 to locate the S-CSCF server 117 in the destination devices network (not shown).

The S-CSCF server 117 may include a communication signaling protocol (e.g., SIP) server that serves as a central node in the communication signaling protocol signaling plane. The S-CSCF server 117 may perform session control. Another network element incorporated into the P-CSCF server 116 may be an interrogating call session control function (I-CSCF) server (not shown), which may include a communication signaling protocol server that may be located at an edge of an administrative domain. The I-CSCF server 116 may publish its IP address in the Domain Name System (DNS) record of the domain in which the I-CSCF server 116 resides so that remote servers can find the I-CSCF server 116 and use the I-CSCF server 116 as a forwarding point for communication signaling protocol packets in the domain. In addition to communication signaling protocol proxy functionality, the I-CSCF server 116 may include an interface to the HSS (114) to retrieve user information and to route messages to an appropriate destination (e.g., S-CSCF server 117) or data server 157.

Another network element may be a communication signaling protocol telephony application server (TAS) 119 that provides applications for use by a mobile device. The TAS 119 provides services through applications related to signaling and media distribution. For example, signaling refers to resolving routing related to free calls, resolving telephone number translations that allow for telephone number portability and the like, while media distribution refers to establishing voice and video calling, conference calling and similar services. Yet another network element is a media resource function (MRF) device 113 that is configured to control the establishment/charging of resources within IMS core 110. The communication signaling protocol TAS 119 may include a communication signaling protocol entity that hosts and executes services, and interfaces with the S-CSCF server 117. The HSS 114 may include a master user database that supports IMS network 110 and contains subscription-related information. The HSS 114 may perform authentication and authorization of users and can provide information about a subscriber's location and IP information. As a call request message generated by a calling party is transmitted from one network element to another network element for subsequent delivery to a destination party (including one or more of data servers 157), the call request message may be updated by the respective network element to include a custom header. The custom header may include information that identifies the respective network element, provides instructions for a subsequent network element, causes the respective network element to take an action based on the information, or the like. For ease of explanation and discussion, the call request will be referred to in terms of SIP messages. For example, a call request message in the SIP protocol, a SIP INVITE message, may have a custom header directed to another device or service in the network that receives SIP messages.

Networks 110 may include any type of network or combination of networks such as LAN, WLAN, WAN, WWAN, etc. The network 110 may be capable of providing a variety of communication network services, such as registration services, authentication services, authorization services, call session control services and other types of communication services. Specifically, these networks may be configured to include IMS networks. The network 110 may communicate with one another through various network components.

The LTE standard includes protocols, such as a Radio Resource Control (RRC) protocol, which is responsible for the assignment, configuration, and release of radio resources between a user equipment (e.g., a mobile telephone, a smartphone, mobile devices, and the like) and a base station, such as an eNodeB, other access point equipment or LTE equipment. According to the RRC protocol, the two basic RRC modes for the UE are a "connected mode" and an "idle mode." During the idle mode, the user device may shut down at least some of its connected mode operations. During the connected mode, the user device may exchange signals with a network and may perform other related operations. While in the "connected mode" the UE 105 may have multiple DRX profiles available for consideration to respond to decreasing power consumption states. The transitions to the lower power consuming states are based on timers referred to as inactivity timers. From time to time, the eNodeB may send signals to the respective UE indicating that the RRC connection mode is being reconfigured. The described examples describe the selection of an appropriately suited DRX profile for the present operating state of the UE from a multitude (more than two) of various DRX profiles to more effectively manage the power settings of a UE.

Current 3GPP Release 11 allows for a single bit value (i.e., 1 or 0) to be used for switching between the two DRX settings described in Release 11. In Release 11, the network, such as via the eNodeB 112, 512, dictates which of the two DRX setting the UE is to be set. In contrast, the described examples extend the use of a single bit PPI by providing examples of a dynamic method in which a UE recommends a selection of one optimum profile from multiple (more than 2) DRX profiles using the single 3GPP PPI bit signal. As will be described in more detail later, the single PPI bit signal is used to indicate direction within a DRX profile data structure and the number of transmissions of the PPI signal within a time period indicating the number of steps from one DRX profile to a next DRX profile within the DRX profile data structure. Based on the bit value and number of PPI signals, the DRX profile settings are selected for communication between the respective UE 105 and any eNodeBs such as 112.

In order to facilitate the use of the multiple DRX profiles and generation of the correct number and bit value PPI signals, the respective UE 105 may include a Power Preference Indicator (PPI) manager application. The PPI manager application is configured to monitor the operational state of the UE 105 and exchange information with an appropriately programmed eNodeB, such as 112. The appropriately programmed eNodeB is configured to execute program instructions that allow the eNodeB 112 to receive from the UE 105 the single PPI bit signals and make the appropriate change to the DRX profile. In an example for providing DRX profile setting assistance to the eNodeB 112, a DRX profile server 131 may be in communication with the eNodeB 112 and provide information related to the DRX profiles that are optimum for the current communication session between the UE 105 and the eNodeB 112. For example, the eNodeB 112 may transmit to the DRX profile server 131 a request that includes information (e.g., the mobile device number (MDN)) that is used to identify a discontinuous reception profile table associated with the UE 105. The DRX profile server 131 is configured to respond to the request by sending to the eNodeB 112 a DRX profile setting table associated with the UE 105, a current DRX profile setting for the UE 105 based on the request information, or the like based on the request information. Alternatively, the request information may include the number of power preference indicator (PPI) signals that were received by the eNodeB 112 from the UE 105. In this case, the DRX profile server 131 may return the updated DRX profile setting (i.e., PP index value that is unique for each of the respective DRX profiles) to the eNodeB 112. The eNodeB 112 may forward the updated DRX profile setting to the UE 105 as confirmation of the change requested by the UE 105 from the current DRX profile setting to the updated DRX profile setting.

Figure 2:
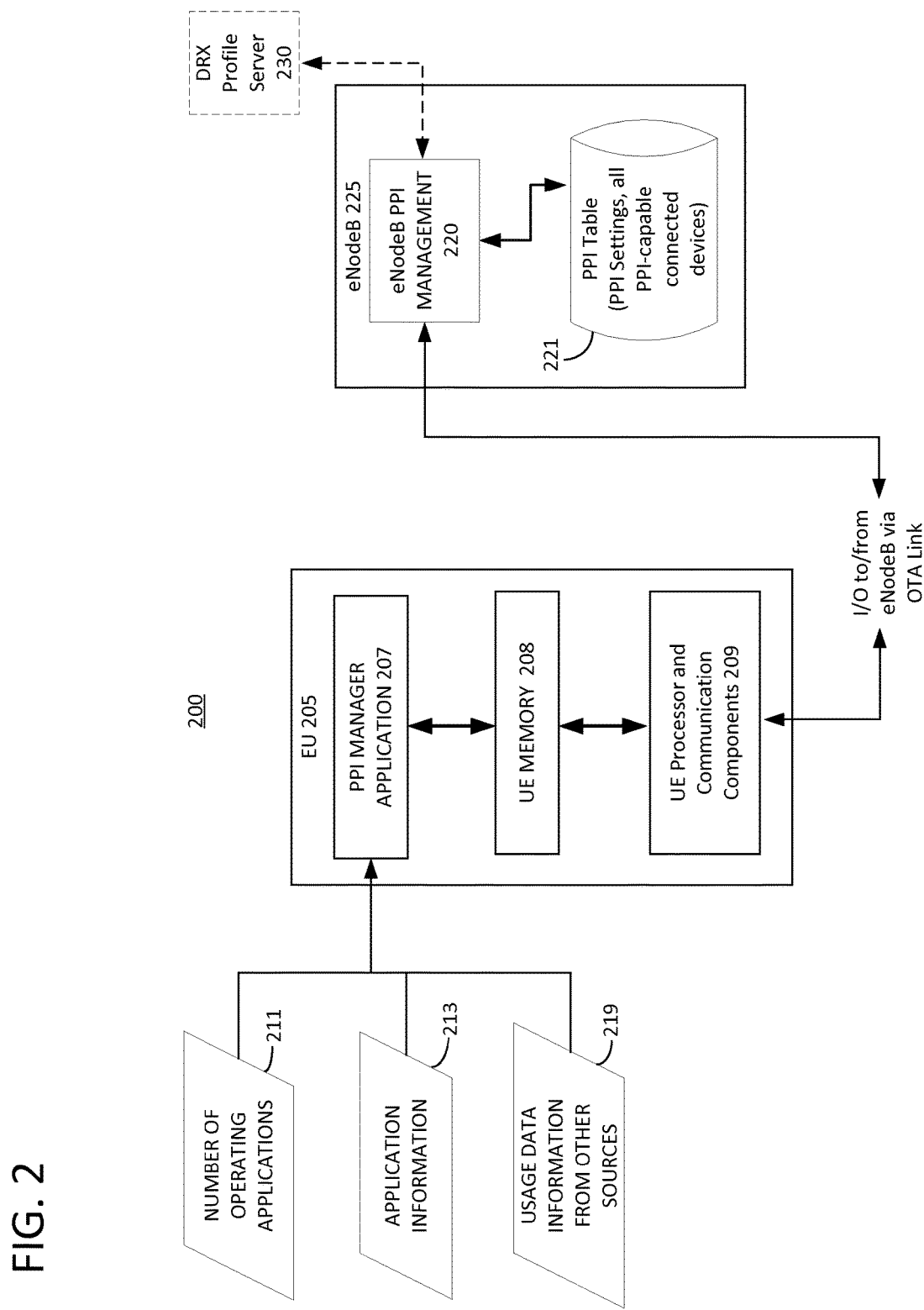
FIG. 2 illustrates a high-level functional block diagram of a Power Preference Indicator management application of a UE and a communication network entity components supporting the selection of a DRX profile setting for the UE.

FIG. 2 provides a high-level functional block diagram of the PPI manager application of a UE 205 and an eNodeB 225. The UE 205 includes a PPI manager application 207, a memory 208, and UE processor and other components 209. The functional components of UE 205 will be described in more detail with reference to FIG. 5. The PPI manager application 207 executes on the UE processor 209 and monitors the operating state of the UE 205. The operating state of the UE 205 may be determined using data from various sources. For example, the PPI manager application 207 may use information, such as the number of applications operating on the UE 211, application information related to the operating applications 213, and data usage information from other sources 219.

Information related the number and types of applications operating on the UE 205 includes, for example, the number of applications (e.g., games, stock ticker, news applications, video and audio applications) that a user has selected via an input device to launch, as well as applications operating in the background, such as global positioning system (GPS), Bluetooth, or other applications that may use the data channel of the UE 205. The number and types of applications operating on the UE 205 are used by the PPI manager application to assess the use and expected future use of the data channel by each of the respective operating applications. The application information 213 refers to information related to the operating applications, and includes, for example, an application's tolerance for data delays (e.g., 10 milliseconds (ms) to 100 ms, or the like), an amount of data that an application uses when communicating via the downlink and/or uplink, and the like. The data usage information from other sources 219 may be historical data usage information collected for the different applications installed on the UE. The data usage information may be stored on the memory 208 of the UE 205. Alternatively, the "other sources" of data usage information may be servers, such as the DRX Profile server (113 of FIG. 1) or an application server (not shown) connected to the wireless access network 102 of FIG. 1.

In general, and as will be described in more detail with reference to FIGS. 3 and 4, the PPI manager application 207 accesses a DRX profile data structure (described in more detail with reference to FIGS. 3 and 4) in memory 208 and, using the data provided, determines the DRX profile setting that best conserves power for the UE 205. Upon making the selection of the DRX profile, the UE 205 transmits one or more PPI signals to the eNodeB 225 depending upon the selected DRX profile. The eNodeB 225 receives the PPI signals, which are then provided to an eNodeB PPI management process 220. The eNodeB PPI management process 220 responds to the received PPI signals by accessing a data structure (e.g., table) similar to the DRX profile data structure used by the PPI manager application 207. A database, such as PPI database 221, may store information such as a PPI table and the PPI settings for all PPI-capable UE device connected to an eNodeB. The PPI database 221 may be coupled to the eNodeB 225, a DRX profile server 230, or both. In an alternative example, the eNodeB 225 is connected to the DRX profile server 230, which is configured to manage all of the PPI settings (i.e., DRX profile settings of connected UEs) for the eNodeB 225. In some examples, the DRX profile server 230 manages the PPI settings for other eNodeBs (not shown).

In an example, the DRX profile server 230 analyzes operating status-related information provided by the respective connected UEs, such as UE 205, to determine whether additional discontinuous reception profiles should be developed or whether present discontinuous reception profiles are out-of-date. In response to the analyzing, the DRX profile server 230 either generates a new DRX profile for inclusion in a revised DRX profile table (i.e., revised PPI table) or deletes out-of-date DRX profiles to form a DRX profile table (i.e., revised PPI table).

Based on the received PPI signals and the DRX profile located in the PPI table by the eNodeB PPI management process 220, the eNodeB 225 returns to the UE 205 a DRX profile indicator that indicates an updated DRX setting for the UE 205. After updating the DRX profile setting, the UE 205 begins operating according to the updated DRX profile setting. In other words, the UE 205 does not actually operate according to the updated DRX profile setting until receiving confirmation at the network level (i.e., from the eNodeB 225) that the DRX profile setting of the UE 205 has been updated.

In another example, the UE 205 may provide operating status information, such as operating parameters of the applications operating on the UE 205, to the eNodeB 225. The eNodeB 225 provides the UE 205 operating status information to the DRX profile server 230. The DRX profile server 230 is configured via programming instructions to analyze the UE operating information. Based on the analysis, the DRX profile server 230 determines that there is a need for updated DRX profiles, and generates an updated DRX profile to optimize the DRX performance (e.g., improves power conservation and uplink and downlink data transmission) of the UE 205. In an example, the DRX profile server 230 indicates directly to the eNodeB 225 that the DRX profile setting of the respective UE 205 should be updated to conserve network resources and power of the UE 205. As a result, the eNodeB 225 sends an updated DRX profile setting signal (e.g., a radio resource control connection reconfiguration (RRCConnectionReconfiguration) signal) to the UE 205, which changes its DRX profile setting according to the updated DRX profile setting signal from the eNodeB 225.

The operation and functions of the PPI manager application 207, the UE 205 and the eNodeB 225 may best be explained with reference to the example operations illustrated in FIG. 3 with reference to the DRX profile table of FIG. 4.

Figure 3:
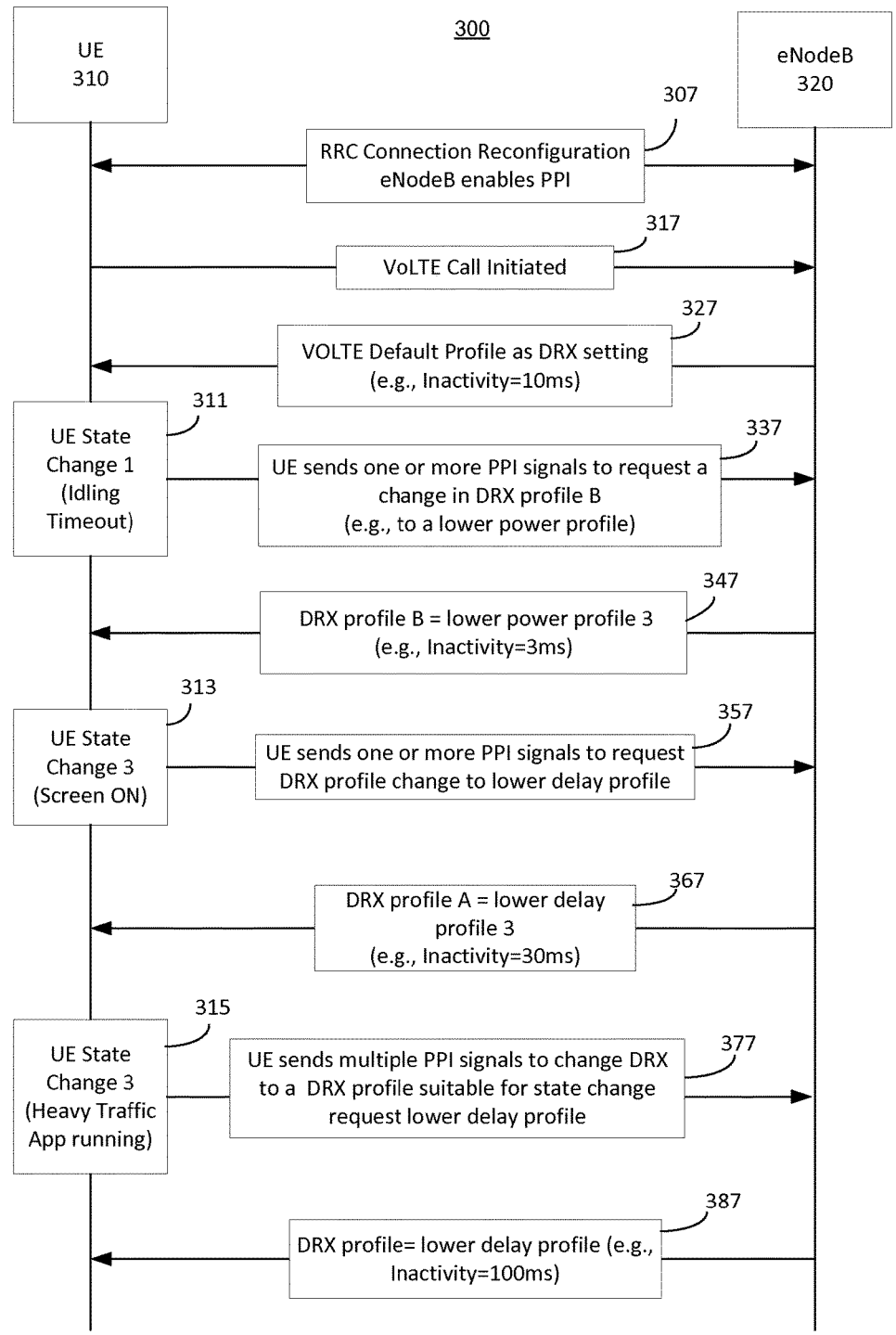
FIG. 3 is a call flow diagram of an example scenario for updating a DRX profile setting based on changes in the operating status of a UE.

FIG. 3 illustrates an example of UE configuration signaling exchanged between a user equipment (UE), such as 105 and an eNodeB, such as 112. In the UE configuration signaling exchange 300, a UE 310 and an eNodeB 320 are exchanging configuration signals for configuring the UE 310. According to examples of the present disclosure, the UE 310 includes a PPI manager application that is executing on a processor of the UE 310. The PPI manager application monitors the operating state of systems on the UE 310 (i.e., mobile device) and is configured to determine whether the monitored operating state of the UE systems conforms with the current DRX profile setting. For example, the UE 310 processor (not shown in this example) may be configured to execute the PPI manager application that will identify open applications and obtain operating parameters regarding the open applications. Operating parameters may include data latency tolerance (i.e., how long the application can go without receiving new data), amount of data the application typically receives and how long it typically takes to receive the data via a cellular connection, other resources (e.g., video and/or audio codecs, display device, speaker) used by the application, and the like. The PPI manager application determines, based on the operating state (e.g., number and type of applications open on the UE, demand for a data channel over which the UE is connected to the network, and the like) of whether the operating state of the UE 310 conforms to the current DRX setting, and based on a result of the determination, outputs a signal. In addition, the UE 310 and the eNodeB 320 may be configured to operate according to a number of different DRX profiles. The different DRX profiles allow the UE 310 to function in different states based on the operating conditions of the UE 310 at the time. For example, as will be discussed in more detail below, a change from one DRX profile to another DRX profile of the UE 310 may be based on the systems (e.g., processor performance, display performance, speaker performance and the like) operating on the UE 310.

The eNodeB 320 may determine that the UE 310 connected to the eNodeB 320 is a PPI-capable UE. PPI-capable meaning the UE is equipped with a PPI management application. This determination may be made for example based on transmissions by the UE 310 capabilities during the establishment of a session with the eNodeB 320. In response to the determination, the eNodeB 320 transmits a RRC connection reconfiguration signal. The initial setting 307 is a RRC connection reconfiguration signal that enables use of the Power Preference Indication (PPI) protocol to be used by the UE 310 during RRC connection mode with the eNodeB 320.

While in the RRC connected mode and with the PPI DRX profile setting enabled, the UE 310 may initiate a voice-over-LTE (VoLTE) call (317). In response to the initiation of the VoLTE call, the eNodeB 320 responds by informing or instructing the UE 310 of the VoLTE connected-mode discontinuous reception (DRX) default setting via a return message 327. For example, the VoLTE DRX default setting may be 10 milliseconds (ms). The default VoLTE DRX setting may indicate to the UE 310 that after 10 ms of inactivity, the UE 310 transitions from an active state to a lower power state. The UE 310 may operate at this default VoLTE DRX setting for a period of time. At some time, the state of the UE 310 changes (for example, an idling timer times out (i.e., the UE is not very active)) at 311. A PPI manager application on the UE 310 that is monitoring the operating state of the system on the UE 310 may detect this state change and evaluate the operating state of the UE 310. In an example, the PPI manager application continuously monitors the operating state of the system on the UE 310. In another example, the PPI manager application monitors the operating state of the system on the UE 310 periodically (e.g., 5-100 seconds, 1-5 minutes, or the like) in which the period changes based on the system operating state or some other condition (e.g., time of day, number of open applications, etc.) of the UE 310. In response to the change of state and the results of the evaluation, the UE 310 transmits, or sends, a DRX setting request message containing information related to the DRX setting, or profile of the UE 310 (337). For example, the request message may include a number of single-bit PPI signals having the same single-bit value corresponding to a lower power profile that is selected by the PPI manager from a discontinuous reception profile table stored in a memory of the UE 310. In an example, the UE 310 sends one or multiple PPI signals to initiate the change of the DRX setting to the eNodeB 320. The determination of the number of PPI signals to send and the bit value is made based on a table of DRX profiles.

Figure 4:
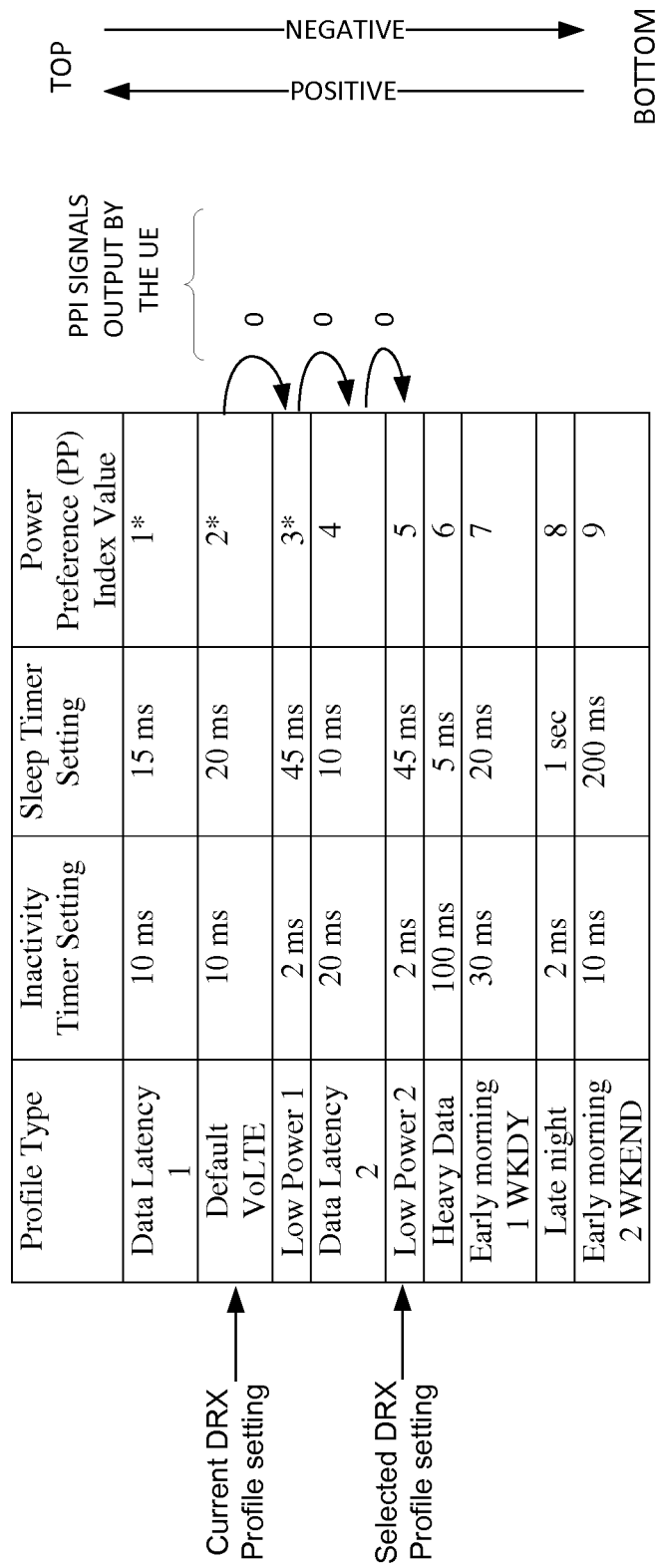
FIG. 4 is an example of a data structure used in the adaptive DRX profile setting service.

A table or file containing the same information, such as that shown in FIG. 4 is stored in both the UE 310 and the eNodeB 320. For example, as shown in FIG. 4, nine (9) DRX profiles (each uniquely identified by one of PP Index values 1-9) are available. Of course, although nine (9) DRX profiles are shown, any number of DRX profiles greater than two DRX profiles may be available for selection. The greater number of profiles allows for greater flexibility with the network throughput and identifying opportunities to conserve UE battery life. The different profiles are based on compromises made for each type of application that may be operating on the mobile device. For example, a first application may have a data delay tolerance that overlaps at the higher end of the tolerance with a second application that has a shorter data delay tolerance. As a result, in a DRX profile generated to accommodate both the first and second applications, such as DRX profile PP Index 5 (See FIG. 4), the first application may always have to wait longer (i.e., farther (or higher)) into its data delay tolerance when the DRX profile PP Index 5 is used. However, with more profiles, less compromises need to be made. For example, a third application's data delay tolerance may also overlap with the first application's data delay tolerance, but closer to the lower end of the tolerance. In a DRX profile generated to accommodate the first and the third applications, such as DRX profile PP Index 6, the first application would not have to wait as long to retrieve data when the DRX profile PP Index 6 is used. The generation of the different DRX profiles is driven by a specific application's or combinations of applications that influence on the data channel (and the applications ability to tolerate data delay), such as the application's need for the data channel and/or how frequently the application accesses the data channel from an idle mode.

In another example, the maximum data delay tolerance of a group of applications may vary based on the types of applications (e.g., a stock ticker application versus a contact organizer application) in the group. For example, two applications may have vastly different delay tolerances (e.g., App A (e.g., stock ticker) has a lower delay tolerance than App B (e.g., contact organizer). Since App A will be adversely impacted by having to wait longer for data, the delay tolerance of App A is more critical, and is used in the development of the DRX profile for App A and App B. As a result, the App A and App B DRX profile will not provide as much power savings as a DRX profile developed using only the App B data delay tolerance. Of course, if the data delay of App A and App B were more similar, more power savings would be achieved. A benefit of the presently disclosed examples is that DRX profiles may be developed with more flexibility that allows for more dynamic and fine grain control of the power usage through DRX profiles as opposed to the fairly static DRX profile settings described in the Background.

To assist with the determination of which DRX profile is most appropriate for a UE at any particular time, a Power Preference Indicator (PPI) Manager (discussed briefly with reference to FIG. 2) is provided. In more detail, the PPI manager is an application executing in the background when the UE is turned "ON." The PPI manager, for example, uses key applications (e.g., those most frequently used or considered most critical to providing an expected quality of service (QoS) for the respective connection) as the basis for determining the particular DRX profile for the UE. As mentioned above, the PPI Manager determines, for example, by accessing information from the UE memory about the application, or receiving from the application, a maximum data delay an application is able to tolerate. For example, in a voice application, the delay cannot be too long—otherwise, data packets may be dropped. Therefore, a DRX profile with a shorter data delay may be selected. Applications may provide to the PPI manager information regarding the application's data usage. For example, the applications can send parameters regarding delay tolerance, performance expected, data rate usage and the like to the PPI manager. In some examples, the PPI manager application collects information such as delay, bit rate, jitter delay tolerance, tolerance for lost packets and retransmission, buffering delay, and the like as well as QoS parameters, such as, for example, error rates, throughput, bandwidth, transmission delay, jitter and the like by monitoring the application while the application is executing on the UE.

FIG. 4 illustrates an example of the information that may be included in the DRX profile data structure. For example, information such as the Profile Type, an inactivity timer setting, sleep timer setting, power preference index, and the like may be stored in the data structure. The profile type may be a general description of the operating condition of the UE that the profile is attempting to cover. For example, the profile types Data Latency 1, Data Latency 2, Heavy Data and Early morning 1 Weekday (WKDY) may be used to address applications that are sensitive to delays in receiving data from the network, or scenarios in which data delays are unwanted. As a result, the inactivity timer and the sleep timer settings may be set to allow for more frequent reception of data and for longer durations between idle periods. Conversely, other profile types may include settings aimed at conserving power, such as Low Power 1, Low Power 2, Late night or Early morning 2 Weekend (WKEND), and may not be as concerned with receiving data in an expeditious manner. The demand for the data channel by the applications running on the mobile device is a common criteria of a profile that is included in the more than two DRX profiles maintained in the data structure. The power preference (PP) index is a value that uniquely identifies each of the respective profiles in the DRX profile data structure. For example, profile type Data Latency 1 has a PP Index of 1, while Data Latency 2 has a PP Index of 4.

Different applications' usage scenarios cause different problems for the maintenance of the UE 210 battery life. For example, data packets for a VoLTE call, which is performed by a voice application, are short in duration and are periodic. As such, when on the VoLTE call, the UE wakes up to perform voice encoding and decoding, and goes back to sleep during lulls in the conversation. Meanwhile, for video streaming, the usage scenario is different because the UE will be receiving a large amount of data, be decoding data more often, and will also be rendering video. The previous two examples may be the extremes for data usage, while a more sporadic use of the data channel is web browsing. When web browsing, the web browser receives a large amount of data in a short amount of time, decodes the data and renders the data (i.e., data channel usage is high and UE system usage is power intensive); however, afterwards, the user is reading the rendered data and the data channel usage is minimal, and UE system power usage is also reduced.

At a high level, the DRX profile types are based on an application's characteristics related to data channel usage. For example, a PPI manager may make determinations regarding individual applications or whether the data channel usage is periodic or aperiodic; whether data usage is low, medium or high; the identified data tolerances for the respective applications; and the like. But battery life is also critical; the profiles are generated to be as efficient in the usage of power as possible. For example, it is not efficient for the UE to be in an active mode and have no data to send, or to be sleeping (e.g., in idle mode) when there is data waiting to be sent. The different DRX profiles are based on reaching a balance of the current (i.e., when the PPI manager application is monitoring) operating conditions, in particular, the power consumption and the data channel usage, of the respective UE. For example, the PPI manager application analyzes the collected information and determines a DRX profile most suited to the current operating conditions of the UE.

In an alternative example, the PPI manager application may deliver application information and information (e.g., via a short messaging service (SMS) message or other messaging program) related to the UE operating conditions to a server, such as a DRX profile server 113 of FIG. 1, via an eNodeB. For example, the DRX profile server 113 may be coupled to the eNodeB 112, and receive the information from the eNodeB 112. The DRX profile server 113 may analyze the information provided by the UE. In response to the analysis, the DRX profile server 113 may recommend to (or command) the eNodeB and the UE to switch to a DRX profile most suited to the current operating conditions of the UE.

Returning to the example of FIG. 3, since a VoLTE call is initiated at 317 in the example of FIG. 3, the eNodeB 320 returns to the UE 310, at 327, a VoLTE Default profile as the DRX setting for the connection between the UE 310 and eNodeB 320. From Table 1 of FIG. 4, the VoLTE Default setting has a power preference (PP) index value of 2. Both the UE 310 and the eNodeB 320 may store the PP index value in a memory location. The PPI manager analyzes the UE change in state at 312. For example, the change in UE state (i.e., UE state change 1) may be a UE idling timeout that is simply an indication that the UE 310 is not very busy. In response to the analysis, the PPI manager may recommend a change from the present VoLTE default profile to a different DRX profile, such as a lower power profile. Said differently, the PPI manager adapts the DRX profile setting to the operating state of the UE. By accessing the information in Table 1 of FIG. 4 that is stored, for example, in the UE 310 memory, the PPI manager, based on the results of the analysis, selects a lower power DRX profile. Upon selection of the appropriate DRX profile, the PPI manager identifies using the Table 1 information the PP index value of the selected DRX profile.

Based on the selected DRX profile and the current DRX profile, the PPI manager may determine the number and bit value of PPI signals that the UE 310 has to generate and have delivered to the eNodeB 320 in order to change from the current DRX profile setting to the selected DRX setting.

For example, the current DRX profile is VoLTE default, which is shown in Table 1 with a PP index 2. The selected DRX profile (recall from above, a lower power profile) is, for example, profile type Low Power 2 that has a PP index value of 5. In this example, the PPI manager determines the number of PPI signals to generate and deliver by determining the signed difference of selected DRX profile PP index value from the current DRX Profile PP index value (i.e., current DRX profile PP index value minus (−) selected DRX profile PP index value), which in the example is 2−5=−3. So in this example, the number of PPI signals to be generated to switch to the Low Power 2 DRX profile is 3, and the sign (i.e., (−) or +) indicates the direction in the table to go (i.e. up or down). The up/down directions are assigned a bit value. For example, the bit value 0 may be assigned the down direction, and the bit value 1 is assigned the up direction. The direction is based on the organization of the information in the table, in particular, the PP index values. For example, at time of set up or implementation, the agreed upon arrangement of the PP index values is either ascending (i.e., 1 at the top down to N, where N is an integer) or descending order (i.e. N at the top down to 1).

Returning to the example, the determined convention at implementation is ascending order for PP index values, and negative (i.e., (−)) is down and positive (i.e., +) is up. As discussed above, the number of PPI signals is 3 and the direction is (−). In the present example, a negative sign indicates downward and the bit value zero (0) is the downward direction bit value. As a result, as shown in FIG. 3, the PPI signals output by the UE 310 are three (3) successive, zero (0) bit signals. The time between outputting the three successive PPI signals only has to be as long as needed for the eNodeB 320 to receive and process the PPI signal. The time period permits the eNodeB 320 to determine when a last PPI signal is received. For example, a suitable interval between PPI signals may be between 1-5 ms, 5-10 ms, 10-30 ms, 15-20 ms, 1-100 ms or the like. In some examples, the interval is also dependent upon the present DRX setting under which the UE and eNodeB are exchanging signals. The eNodeB 320 receives a first PPI signal from the UE 310 and processes (i.e. determines the bit value) the signal, and waits a predetermined time period for any successive PPI signals from the UE 310. After a time, but within the predetermined time period for the delivery of the PPI signals, the eNodeB 320 receives the three PPI signals transmitted by the UE 310 to make the change from the current DRX profile to the selected DRX profile in the example. In an example, the time period (i.e. suitable interval) may be determined according to analysis of historical data related to the respective DRX profiles. Based on the analysis, the time periods are set or changed, for example, via the PPI manager application 207 in the EU 205 or via the eNodeB PPI Management 220 in the eNodeB 225 of FIG. 2.

The eNodeB 320 determines the number of PPI signals, for example, by maintaining a counter for PPI signals from the UE 310. The eNodeB 320 determines the direction to traverse a data table stored in memory depending upon the direction assigned to the respective bit value. In this case, the bit value is 0, and the direction is downward in the table. As shown in FIG. 3, in response to the three successive 0 bit valued PPI signals, the eNodeB 310 iterates through Table 1 from the current DRX profile setting (i.e., Default VoLTE (PP Index 2)) to the selected DRX profile setting (i.e., Low Power 2 (PP Index 5)). Upon locating the selected DRX profile setting, the eNodeB 320 adjusts its DRX setting with respect to the UE 310, and returns a message, such as message 347. The message, at 347, indicates to the UE 310 that the eNodeB 320 has confirmed the change from the current DRX profile setting to the selected DRX profile setting.

The UE 310 and eNodeB 320 may operate at the selected DRX profile setting for a time, which may be a predetermined time, or until a certain time arrives (e.g., midnight or some set time in a preferences file of the UE 310), or until a certain event occurs, such as a change in state of the UE 310. For example, at 313, the UE 310 screen turns ON. The UE 310 processor via the PPI manager application analyzes the change in UE state. Based on the PPI manager applications analysis of the UE 310 state, the PPI manager recommends a change from the present DRX profile (i.e., Low Power 2 (PP Index 5)). Based on an analysis of the present operating conditions of the UE 310 at 313, the PPI manager may recommend a change to a lower delay DRX profile. Based on the analysis and a review of criteria for the respective DRX profile types, the PPI manager recommends, in this example, a change to Data Latency 1, which is a lower delay DRC profile. Returning to Table 1 in FIG. 3, the Data Latency DRX profile has a PP Index value of 1. Using the above methodology for calculating the number and bit value (i.e., direction indicator) of the difference of the (new) selected DRX profile (i.e., Data Latency 1) from the (previous) selected DRX profile (i.e., Low Power 2), the PPI manager determines the number and bit value for the PPI signals to be sent to the eNodeB 320. For example, the Lower Power 2 PP index value is 5 and the Data Latency 1 PP index value is 1. Using the signed difference calculation, 5 minus 1 is positive (+) 4. As a result, the PPI manager instructs the UE 310 processor to output four (4) successive PPI signals with a single bit value of 1 to the eNodeB 320 (357). Of course, the four successive PPI signals will be output after a predetermined time period to allow for receipt and/or processing of the respective PPI signals by the eNodeB 320. The eNodeB 320 receives the four successive, single bit (1) value PPI signals, and, using information from Table 1 of FIG. 3 determines that the new selected DRX profile is Data Latency 1. The eNodeB 320 returns, at 367, a confirmation that the DRX profile setting is to be changed to the Data Latency 1 profile type that has a PP Index value of 1. In response to the confirmation signal (367), the UE 310 changes its DRX profile settings to the Data Latency 1 DRX profile type.

After operating for some time at the Data Latency 1 DRX profile setting, the PPI manager detects another change is state of the UE 310, and analyzes the current operational state of the UE 310. At UE state change 3 (315), the PPI manager determines that a heavy traffic application is being used on the UE 310. In other words, the UE 310 is more actively downloading data. As a result of the UE state change, the PPI manager accesses the table of DRX profiles, and locates a DRX profile having the criteria most closely matching the analyzed operational state of the UE 310. For example with reference to Table 1 of FIG. 3, the PPI manager determines that the operational state of the UE 310 most closely matches the criteria of the Heavy Data profile type, which has a PP index value of 6. Recall that the present DRX profile type setting between the UE 310 and the eNodeB 320 is Data Latency 1, which has a PP index value of 1. The PPI manager performs the signed difference calculation, which returns a difference of 5 and a sign of negative (−). As a result, the PPI manager instructs the UE 310 processor to output five successive, zero bit value PPI signals (377) with the appropriate time period between successive signals. In response to receiving the five successive, zero bit value PPI signals in the appropriate interval, the eNodeB 320 processes the PPI signals and confirms (387) the change to the Heavy Data DRX profile type.

Although not shown, the UE 310 in response to the DRX profile confirmation signals (i.e., signals 327, 347, 367 and 387) may send an acknowledgement back to the eNodeB 320 indicating that the confirmation signals correctly identify the DRX profile type indicated by the PPI manager. During initialization, UE and Network will reset DRX state to a common DRX state.

The described examples allow for the generation of multiple DRX profiles beyond the two profiles presented in the 3GPP, Release 11 document. For example, in situations where throughput is diminished, current implementations are unable to adjust dynamically to the change in conditions because the DRX profiles needed to adjust are not available. In a concrete example, when a UE is participating in a VoLTE call and performs a web search, the current DRX settings have difficulty managing the device to provide optimum performance and efficient power savings. Recall that DRX is intended to be a power saving mechanism for the UE. As a result, a number of DRX profiles may be generated to allow for optimum device performance as well as increased power savings.

As another example, consider the following with reference to PP Index values 1-3 of Table 1 in FIG. 4. Note each of PP Index values 1-3 has an asterisk adjacent to it and that the table has a footnote stating, "where * indicates an example of most frequently used profiles." The information in Table 1 may be organized so that the most frequently used DRX profiles are closest to one another. In this way, a minimum number of PPI signals, at best, one (1), regardless of bit value need to be exchanged. For example, if Default VoLTE is the most frequently used DRX profile type, which means the use of the UE 310 most frequently matches the criteria of the Default VoLTE profile type, then it may be set at a point in Table 1 that is central to the next most frequently used DRX profile, such as Data Latency 1 or Low Power 1. As a result, the PPI manager and the UE 310 processor only have to output one PPI signal with either a 0 or 1 value, and not multiple signals.

In an example to further minimize wait time for the DRX profile change, a time interval, or time period, length indicator (e.g., 1 or 2 bits) is provided with the PPI signal (e.g., affixed to the PPI signal or in a separate control signal) to the respective eNodeB 320, and the eNodeB 320 will have a time interval setting that corresponds to the indicated time interval (i.e., time period) length. In such an example, the eNodeB 320 processes the PPI signal as usual except according to the indicated time interval length.

In some examples, the information in Table 1 may be dynamic. For example, the PPI manager may reorganize the DRX profile types within the Table 1 by reassigning PP Index values to DRX profiles that are determined to be more frequently used, or used less frequently, and as a result, to more efficiently traverse the table, the PPI manager reassigns the DRX profile type PP Index values. Of course, this reassigned DRX profile type PP Index values are shared with the respective eNodeB 320 with which the UE 310 communicates. Alternatively, the eNodeB 320 may use network resources, such as DRX setting server 113, to perform the dynamic analysis of the DRX profile table. Upon conclusion of the analysis, the eNodeB 320 may download the DRX profile table to a specific UE or to all PPI capable UEs connected to the eNodeB 320. The eNodeB 320 may confirm the table version stored on each UE at the time of establishing a session with the respective UE.

In another example of the PPI message sent at 337 of FIG. 3, the PPI value may be more than a single bit. For example, a number of bits that specify a value that corresponds to a particular DRX setting or profile may be transmitted. In this example, the PPI message sent by the UE may include a PPI value based on multiple bits corresponding to a lower power profile that is selected by the PPI manager from a discontinuous reception profile table stored in a memory of the UE 310. In addition or in another example, a multi-bit PPI value includes a first bit indicating up or down direction in the table, and the next predetermined n bits indicate, in binary the number of steps (e.g., 3 steps=11 (in binary)). This allows a greater number of combinations with fewer bits for more states (e.g., 16 states=5 bits, vs. having to send out 7 bits for a max shift). Furthermore, time is saved as there is less wait time for additional PPI signals and the opportunity for errors is reduced.

Regarding possible errors, an example is envisioned in which the eNodeB 320 is configured to distinguish between expected values and received values, and response performing error correction. For example, in an earlier example, a PPI signal output by the UE 310 are a negative sign indicator, which indicates a downward direction in the discontinuous profile table, and three (3) successive, zero (0) bit signals (i.e., 0, 0, 0), which represent the number of steps within the discontinuous profile table. Suppose that due to an issue in the communication channel that middle signal of the three successive signals indicates a one (1) instead of a zero (0) (i.e., 0, 1, 0). Since the eNodeB 320 was expecting successive signals with zero bits, the eNodeB 320, in this example, is configured to note the different PPI signal value. In response to noting the difference between the successive signals, the eNodeB 320 requests a re-transmission of the erroneous PPI signal. Alternatively, the eNodeB 320 based on the values of the other received PPI signals in the succession of PPI signals determines that the value of the particular PPI signal is an error, and simply changes the value to conform with the other PPI signal values. Returning to the example of successive PPI signals (i.e., 0, 1, 0), in which the middle PPI signal value is a one (1) instead of a zero (0), the eNodeB 320 identifies the potential error, and based on the bit values of the PPI signals received prior to and afterwards, determines that the value of middle PPI signal should have been a zero (0). In response to the determination, the eNodeB 320 counts the middle PPI signal as another successive zero signal. In other words, the minority PPI signal value is replaced with the majority PPI signal value. Accordingly, the eNodeB 320 traverses the discontinuous profile table for three successive zero (0) steps. Of course, other error correction methodologies may be implemented that accomplish a similar result.

Figure 5:
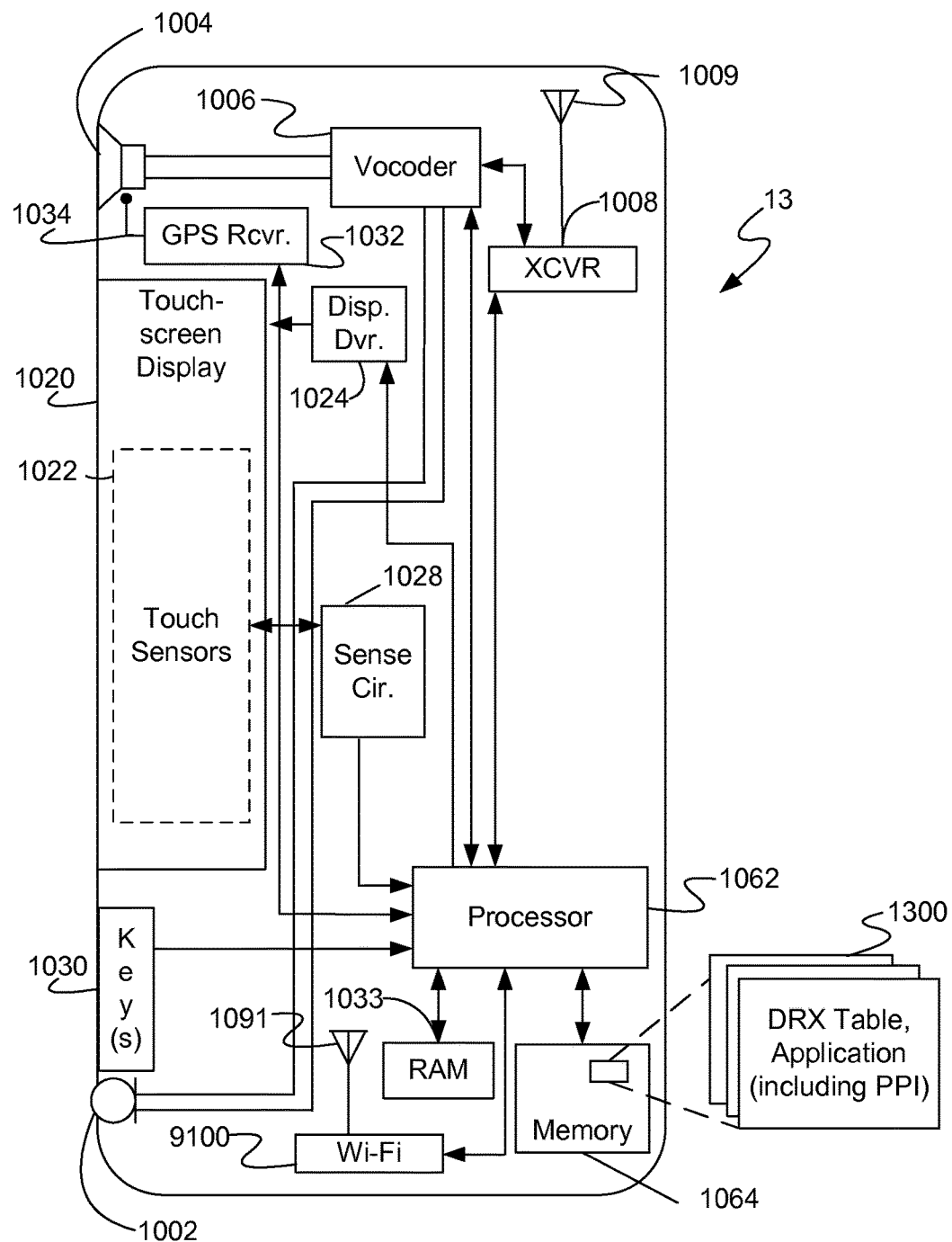
FIG. 5 is a high-level functional block diagram of an example of touch screen type mobile station as may utilize the adaptive DRX profile setting service through a network/system like that shown in FIG. 1.

At this time, it may be useful to consider, at a high level, the functional elements/aspects of the UE 310 and the PPI manager in more detail. FIG. 5 provides a block diagram illustration of an example of touch-screen type mobile device 13. A UE, such as mobile device 13, although shown as a handheld smartphone for discussion purposes, may also be a tablet or may be incorporated into another device, such as a personal digital assistant (PDA) or the like. The mobile device 13 functions as a normal digital wireless telephone device. For that function, the device 13 includes a microphone 1002 for audio signal input and a speaker 1004 for audio signal output. The microphone 1002 and speaker 1004 connect to voice coding and decoding circuitry (vocoder) 1006. For a voice telephone call, for example, the vocoder 1006 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13 also includes at least one digital transceiver (XCVR) 1008. Today, the handset 13 is configured for digital wireless communications using one or more of the common network technology types. In an example, the XCVR 1008 is configured as a transceiver suitable data (which includes voice) communications over a long term evolution (LTE) network according to any standards or requirements related to VoLTE. The concepts discussed here encompass embodiments of the mobile device 13 utilizing any digital transceivers that conform to current or future developed digital wireless communication standards. The mobile device 13 may also be capable of analog operation via a legacy network technology.

The transceiver 1008 provides two-way wireless communication of information, such as vocoded speech samples and/or digital information for data communications (including for authentication), in accordance with the technology of the networks of FIG. 1. The transceiver 1008 also sends and receives a variety of signaling messages in support of the various voice and data services provided via the mobile device 13 and the communication network. Each transceiver 1008 connects through RF send and receive amplifiers (not separately shown) to an antenna 1009.

A microprocessor 1062 serves as a programmable controller for the mobile device 13, in that it controls all operations of the mobile device 13 in accord with programming that it executes, for all normal operations, and for operations involved in the mobile application adaptive DRX profile setting service under consideration here. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 1062, for example, may be based on any known or available microprocessor architecture, such as a Reduced Instruction Set Computing (RISC) using an ARM architecture, as commonly used today in mobile devices and other portable electronic devices. Of course, other microprocessor circuitry may be used to form the CPU or processor hardware in server computers or other user terminal computer equipment.

The microprocessor 1062 serves as the programmable host for mobile device 13 by configuring the mobile device 13 to perform various operations, for example, in accordance with instructions or programming executable by microprocessor 1062. For example, such operations may include various general operations of the mobile device 13 as well as operations related to confirming or adjusting operational settings of the mobile device 13, contacting network devices, storing user preference information, controlling encoding/decoding of voice and video data, and the like. Although a processor may be configured by use of hardwired logic, typical processors in mobile devices are general processing circuits configured by execution of programming. The microprocessor 1062 connects to other elements of the mobile device 13 via appropriate circuitry, such as bus or terminal connections. In a present example, the mobile device 13 includes flash type program memory 1064, for storage of various "software" or "firmware" program routines such as device operating system (OS), voice encoding/decoding algorithms, video encoding/decoding algorithms, programs related to graphical user interface elements and functions. The memory 1064 also stores mobile configuration settings, such as the MDN, the IMEID and/or mobile identification number (MIN), etc. The mobile device 13 may also include a non-volatile random access memory (RAM) 1033 for a working data processing memory. Of course, other storage devices or configurations may be added to or substituted for those in the example. The memories 1064, 1033 also store various data, such as telephone numbers and server addresses, downloaded data such as multimedia content and applications, and various data input by the user. Programming stored in the flash type program memory 1064, sometimes referred to as "firmware," is loaded into and executed by the microprocessor 1062. For example, the PPI manager application code is stored in the memory 1064.

As outlined above, the mobile device 13 includes a processor, and programming, such as mobile application(s) 1030, stored in the memory 1064 configures the processor so that the mobile device is capable of performing various desired functions, including in this case the functions involved in the technique for providing revisions to the discontinuous reception settings of the mobile device 13. The logic implemented by the processor 1062 of the mobile device 13 configures the processor 1062 to control various functions as implemented by the mobile device 13. The logic for a processor 1062 may be implemented in a variety of ways, but in our example, the processor logic is implemented by programming for execution by the processor 1062. Regular operations of the device are controlled by operation of the processor 1062. DRX tables and applications, such as the PPI manager application, 1300 may be stored in flash memory 1064. The DRX tables may include a list of different DRX profiles that are suitable for different use cases of the UE 13. The DRX profiles 1300 stored in memory 1064 may be based on the number of applications open on the UE, the data usage requirements for each open application, data delay tolerances for each application and a level of user interaction with the device at a given moment. In addition to the different applications (e.g., games, productivity, entertainment (video and/or audio), voice and so on), which are stored in memory 1064, a power management application may also be stored in the memory 1064.

The mobile device 13 includes a touch-screen display 1020 for displaying messages, menus or the like, call related information dialed by the user, calling party numbers, etc., including the described adaptive DRX profile setting service. Keys 1030 or a virtual keyboard presented via the touch-screen display 1020 may enable dialing digits for voice and/or data calls as well as generating selection inputs, for example, as may be keyed-in by the user based on a displayed menu or as a cursor control and selection of a highlighted item on a displayed screen. The touch-screen display 1020 and keys 1030 are the physical elements providing a textual or graphical user interface. Various combinations of the keypad 120, touch-screen display 1020, microphone 1002 and speaker 1004 may be used as the physical input output elements of the graphical user interface (GUI), for multimedia (e.g., audio and/or video) communications including communications/interactions related to voice and/or video calling. Of course other user interface elements may be used, such as a trackball, as in some types of PDAs or smart phones.

In addition to normal telephone and data communication related input/output, the user interface elements also may be used for display of menus and other information to the user and user input of selections, including any needed during user selection of a menu option. For example, if used as a selection device, the user interface elements allow a user to input information or make setting selections via, for example, interactions with the PPI manager application, related to the user's usage of the UE and respective data channel for DRX purposes.

For input purposes, touch screen display 1020 includes a plurality of touch sensors 1022. Other interface elements may include a keypad including one or more keys 1030. For example, the keypad may be implemented in hardware as a T9 or QWERTY keyboard of mobile device 13 and keys 1030 may correspond to the physical keys of such a keyboard. Alternatively, keys 1030 (and keyboard) of mobile device 13 may be implemented as "soft keys" of a virtual keyboard graphically represented in an appropriate arrangement via touch screen display 1020. The soft keys presented on the touch screen display 1020 may allow the user of mobile device 13 to invoke the same user interface functions as with the physical hardware keys. In some implementations, the microphone 1002 and speaker 1004 may be used as additional user interface elements, for audio input and output, including with respect to some functions related to the video calling processing and communication, as described herein. The different user interface elements may be used to navigate through the examples of video calling service graphical user interfaces described herein.

For output, touch screen display 1020 is used to present information (e.g., text, video, graphics or other visible digital media content) to the user of mobile device 13. Processor 1062 controls visible display output on the LCD or other display element of the touch screen display 1020 via a display driver 1024, to present the various visible outputs to the device user.

In general, touch screen display 1020 and touch sensors 1022 (and one or more keys 1030, if included) are used to provide the textual and graphical user interface for the mobile device 13. In an example, touch screen display 1020 provides viewable content to the user at mobile device 13. Touch screen display 1020 also enables the user to interact directly with the viewable content provided in the content display area, typically by touching the surface of the screen with a finger or an implement such as a stylus.

As shown in FIG. 5, the mobile device 13 also includes a sense circuit 1028 coupled to touch sensors 1022 for detecting the occurrence and relative location/position of each touch with respect to a content display area of touch screen display 1020. In addition, the sense circuit 1028 is configured to provide processor 1062 with touch-position information based on user input received via touch sensors 1022 (e.g. a user interface element). In some implementations, processor 1062 is configured to correlate the touch position information to specific content being displayed within the content display area on touch screen display 1020. The touch-position information captured by sense circuit 1028 and provided to processor 1062 may include, but is not limited to, coordinates identifying the location of each detected touch with respect to the display area of touch screen display 1020 and a timestamp corresponding to each detected touch position.

There are a variety of ways that a mobile device 13 may be configured to obtain information with respect to current location of the device. In our example, the mobile device 13 includes a global positioning satellite (GPS) receiver 1032 and associated antenna 1034. Location information, in some examples, may be used by the PPI manager in making recommendations regarding the DRX settings.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the adaptive DRX profile setting service examples described herein. The software code is executable by the general-purpose computer that functions as DRX profile server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for selection of DRX profile settings, in essentially the manner performed in the implementations discussed and illustrated herein.

Figure 6:
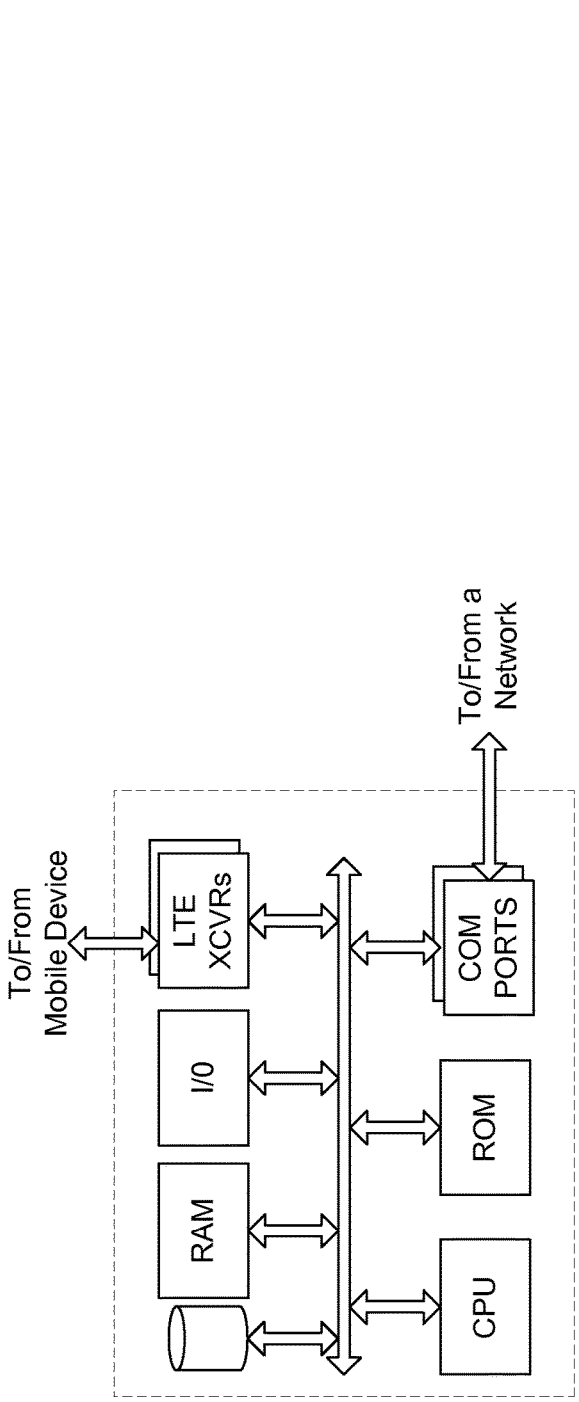
FIG. 6 is a simplified functional block diagram of a wireless network node, such as an evolved node B (eNodeB) found in the system of FIG. 1 and described in FIGS. 2 and 3.

FIG. 6 depicts a system with one or more wireless transceivers, as may be used to implement a wireless network node, such as eNodeB 112 in FIG. 1. A wireless network node, such as an evolved node B, also includes a data communication interface, CPU, main memory and storage for data and/or programming (see FIG. 6). In addition, such wireless network node includes one or more wireless transceivers in order to provide communications services to one or more mobile devices via various radio frequencies in compliance with one or more wireless communications standards (e.g., LTE). Although FIG. 6 depicts the system enclosed within a single structure, such physical structure is not required. Alternatively, or in addition, certain components may be located, either physically or logically, within disparate elements. For example, while the wireless network node includes the data communication interface and wireless transceiver(s), processing to control such communication interfaces may be implemented by a CPU and programming stored in a memory of another device, such as MME 52.

Figure 7:
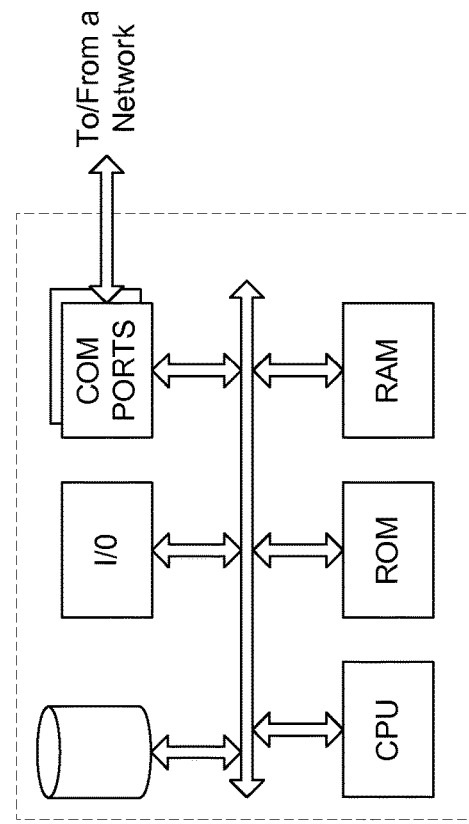
FIG. 7 is a simplified functional block diagram of a computer that may be configured as a host or server, for example, to function as a DRX profile server in the system of FIG. 1.

FIG. 7 provides a functional block diagram illustration of a general purpose computer hardware platform.

More specifically, FIG. 7 illustrates a network or host computer platform, as may typically be used to implement a server, such as DRX profile server and/or any of the other servers/platforms implementing the enhanced more than two DRX profile setting related functions shown in FIG. 1 or 2. A server, for example, includes a data communication interface for packet data communication (see FIG. 7). The server also includes processor hardware implementing a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the VoLTE admission control techniques discussed herein may be downloaded and/or updated from a computer platform, for example, to configure the eNodeB or other server (e.g. FIG. 1 or 2) or from a host computer or the like communicating with the mobile device via the network (e.g. FIG. 1 or 2).

Hence, aspects of the methods of selecting a DRX profile or permitting the change of a DRX profile outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the cellular service provider into the computer platform of the wireless access network that may be the DRX profile server 113. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the service for selecting DRX profiles, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A mobile device, comprising:
   a radio transceiver,
      the radio transceiver communicatively coupled to a component of a mobile communication network;
   a memory,
      the memory storing:
         data related to a state of systems operating on the mobile device, a table of information identifying more than two discontinuous reception profiles,
each of the more than two discontinuous reception profiles being uniquely identified by a power preference index value and criteria for each of the more than two discontinuous reception profiles, and
executable program instructions for determining a discontinuous reception profile for selection from the table; and
a processor,
the processor operably coupled to the radio transceiver and the memory, and
the processor, when executing the program instructions, is to:
identify, based on a signal received via the radio transceiver, current discontinuous reception profile from the table;
configure a discontinuous reception setting of the mobile device according to the current discontinuous reception profile,
the discontinuous reception setting including the power preference index value of the current discontinuous reception profile in the table;
monitor the state of the systems operating on the mobile device;
determine whether the monitored state of the systems operating on the mobile device conforms with the current discontinuous reception profile;
identify, based on determining that the monitored state of the systems operating on the mobile device does not conform with the current discontinuous reception profile and using a current discontinuous reception profile setting as an entry point of the table, an updated discontinuous reception profile from the table;
determine, based on the updated discontinuous reception profile, an updated quantity of power preference indication setting signals to be generated,
each of the updated quantity of power preference indication setting signals having a same value; and
transmit, through the mobile communication network and based on a result of the determination, the updated quantity of power preference indication setting signals within a particular timeframe, the updated quantity of power preference indication setting signals indicating a change flail from the current discontinuous reception profile to the updated discontinuous reception profile.

2. The mobile device of claim 1, wherein when determining whether the monitored state of the systems operating on the mobile device conforms with the current discontinuous reception profile, the processor is to:
compare the monitored state of the systems operating on the mobile device with criteria for the current discontinuous reception profile;
locate, based on comparing the monitored state of the systems operating on the mobile device with the criteria for the current discontinuous reception profile, the updated discontinuous reception profile in the table, the updated discontinuous reception profile having criteria matching the monitored state of the systems operating on the mobile device;
generate, based on locating the updated discontinuous reception profile in the table, the updated quantity of power preference indication setting signals; and
wherein, when transmitting the updated quantity of power preference indication setting signals, the processor is to:
transmit, via the radio transceiver, the updated quantity of power preference indication setting signals to the component of flail the mobile communication network to modify a discontinuous reception profile setting in the component of the mobile communication network.

3. The mobile device of claim 2, wherein the processor is further to:
identify, in the table, flail an updated power preference index value associated with the updated discontinuous reception profile;
compare the power preference index value to the updated power preference index value; and
determine, based on comparing, an index difference value between the power preference index value and the updated power preference index value and a direction indicator,
wherein the direction indicator indicates a direction of the updated discontinuous reception profile from the current discontinuous reception profile in the table.

4. The mobile device of claim 3, wherein the updated quantity of power preference indication setting signals are based on the direction indicator.

5. The mobile device of claim 3, wherein the index difference value is a difference distance.

6. The mobile device of claim 3, wherein, prior to generating the updated quantity of power preference indication setting signals, the processor is to:
determine a direction in the table that the updated discontinuous reception profile is relative to the current discontinuous reception profile of the mobile device based on the power preference index value;
selectively set a bit value for each of the updated quantity of power preference indication setting signals to:
a first bit value when the determined direction is upwards in the table, or
a second bit value when the determined direction is downwards in the table; and
wherein, when determining the updated quantity of power preference indication setting signals to be generated, the processor is to:
determine the updated quantity of power preference indication setting signals to be generated based on a magnitude of the index difference value.

7. The mobile device of claim 6, wherein, when transmitting the updated quantity of power preference indication setting signals, the processor is to:
repeatedly, until a last of the updated quantity of power preference indication setting signals has been transmitted:
wait a predetermined time period; and
transmit another power preference signal of the bit value.

8. The mobile device of claim 7, wherein the processor is further to:
receive a power preference indication from the component of the mobile communication network,
wherein the power preference indication indicates a modification to a component discontinuous reception setting in the component of the mobile communication network; and switch, in response to the received power preference indication from the component, the discontinuous reception setting of the mobile device based on receiving the power preference indication.

9. A network component, comprising:
a wireless transceiver,
the wireless transceiver in communication with a mobile device;
a memory,
the memory storing executable program instructions for setting a discontinuous reception profile for the mobile device; and
a processor operably coupled to the memory,
the processor, when executing program instructions, is to:
receive, from the mobile device, multiple power preference indication setting signals having a same value within a particular timeframe;
access, in response to receiving the multiple power preference indication setting signals, a table of discontinuous reception profiles;
identify, using a current discontinuous reception profile setting as an entry point of the table, an updated discontinuous reception profile in the table based on a quantity of power preference indication setting signals received within the particular timeframe from the mobile device; and
transmit, in response to identifying the updated discontinuous reception profile in the table, a signal indicating the updated discontinuous reception profile to the mobile device.

10. The network component of claim 9, wherein, when identifying the updated discontinuous reception profile in the table, the processor is to:
maintain a count of individual power preference indication setting signals received in the multiple power preference indication setting signals;
identify, based on the count during the particular timeframe, the quantity of power preference indication setting signals;
identify a bit value of the individual power preference indication setting signals,
wherein the identified bit value indicates a direction in the table to move to perform the identification of the updated discontinuous reception profile;
traverse the table, starting from the current discontinuous reception profile setting, for the identified quantity of power preference indication setting signals and in the direction indicated by the identified bit value; and
identify, after traversing the table, the updated discontinuous reception profile.

11. The network component of claim 9, wherein the processor is further to:
receive information related to an operational status of the mobile device;
analyze the information to determine whether to revise the table;
selectively, based on analyzing the information:
generate a new discontinuous reception profile for inclusion in the table, or
delete out-of-date discontinuous reception profiles from the table;
form a revised discontinuous reception profile table based on at least one of generating or deleting; and
deliver the revised discontinuous reception profile table to the mobile device.

12. The network component of claim 9, further comprising a discontinuous reception profile setting server,
wherein the processor is further to:
receive information related to an operational status of the mobile device;
provide the information to the discontinuous reception profile setting server;
receive, after providing the information, a revised discontinuous reception profile table from the discontinuous reception profile setting server,
wherein the revised discontinuous reception profile table includes a different quantity of profiles; and
deliver the revised discontinuous reception profile table to the mobile device.

13. A method, comprising:
identifying, by a mobile device, a current discontinuous reception profile from a table of discontinuous reception profiles in a memory of the mobile device,
the table including more than two discontinuous reception profiles, each of the more than two discontinuous reception profiles being uniquely identified by a power preference index value and criteria for each of the more than two discontinuous reception profiles;
configuring, by the mobile device, a discontinuous reception setting of the mobile device according to the current discontinuous reception profile,
the discontinuous reception setting including the power preference index value of the current discontinuous reception profile in the table;
monitoring, by the mobile device, a state of systems operating on the mobile device;
determining, by the mobile device, whether the monitored state of the systems operating on the mobile device conforms with the current discontinuous reception profile;
identifying, by the mobile device, based on determining that the monitored state of the systems operating on the mobile device does not conform with the current discontinuous reception profile, and using a current discontinuous reception profile setting as an entry point of the table, an updated discontinuous reception profile from the table;
determining, by the mobile device and based on the updated discontinuous reception profile, an updated quantity of power preference indication setting signals to be generated,
each of the updated quantity of power preference indication setting signals having a same value; and
transmitting, by the mobile device and based on a result of the determination, the updated quantity of power preference indication setting signals within a particular timeframe through a mobile communication network,
the updated quantity of power preference indication setting signals indicating a change from the current discontinuous reception profile the updated discontinuous reception profile.

14. The method of claim 13, wherein determining whether the monitored state of the systems operating on the mobile device conforms with the current discontinuous reception profile comprises:
comparing the monitored state of the systems operating on the mobile device with criteria for the current discontinuous reception profile;
locating, based on comparing the monitored state of the systems operating on the mobile device with the criteria for the current discontinuous reception profile, the updated discontinuous reception profile in the table, the updated discontinuous reception profile having criteria matching the monitored state of the systems operating on the mobile device;

generating, based on locating the updated discontinuous reception profile in the table, the updated quantity of power preference indication setting signals; and wherein transmitting the updated quantity of power preference indication setting signals comprises:

transmitting, via a radio transceiver, the updated quantity of power preference indication setting signals to a component of the mobile communication network to modify a discontinuous reception profile setting in the component of the mobile communication network.

15. The method of claim 14, wherein the generated updated quantity of power preference indication setting signals are based on a direction indicator.

16. The method of claim 14, further comprising:

sending information related to an operating state of applications operating on the mobile device to a mobile communication network entity;

receiving from the mobile communication network entity, an updated discontinuous reception profile table; and replacing the table with the updated discontinuous reception profile table.

17. The method of claim 14, further comprising:

identifying, in the table, an updated power preference index value associated with the updated discontinuous reception profile;

comparing the power preference index value to the updated power preference index value; and determining, based on comparing, an index difference value between the power preference index value and the updated power preference index value and a direction indicator, wherein the direction indicator indicates a direction of the updated discontinuous reception profile from the current discontinuous reception profile in the table.

18. The method of claim 17, wherein, prior to generating the updated quantity of power preference indication setting signals, the method comprises:

determining a direction in the table that the updated discontinuous reception profile is relative to the current discontinuous reception profile of the mobile device based on the power preference index value;

selectively setting a bit value for each of the updated quantity of power preference indication setting signals to:

a first bit value when the determined direction is upwards in the table, or a second bit value when the determined direction is downwards in the table; and wherein determining the updated quantity of power preference indication setting signals to be generated comprises:

determining the updated quantity of power preference indication setting signals to be generated based on a magnitude of the index difference value.

19. The method of claim 18, wherein the index difference value is a difference distance.

20. The method of claim 18, wherein transmitting the updated quantity of power preference indication setting signals comprises:

repeatedly, until a last of the updated quantity of power preference indication setting signals has been transmitted:

waiting a predetermined time period; and transmitting another power preference signal of the bit value.

* * * * *